United States Patent [19]

Jester et al.

[11] Patent Number: 4,663,113

[45] Date of Patent: May 5, 1987

[54] REACTOR RADIOACTIVE EMISSION MONITOR

[75] Inventors: William A. Jester; Ira B. McMaster, both of State College; Anthony J. Baratta, Tyrone, all of Pa.

[73] Assignee: Research Corporation, New York, N.Y.

[21] Appl. No.: 505,827

[22] Filed: Jun. 20, 1983

[51] Int. Cl.⁴ ............................................. G21C 17/00
[52] U.S. Cl. ...................................... 376/256; 55/272
[58] Field of Search ............... 250/343; 376/256, 308, 376/313; 252/630; 55/66, 71, 272, 273

[56] References Cited

U.S. PATENT DOCUMENTS

| | | |
|---|---|---|
| 3,327,519 | 6/1967 | Crawford . |
| 3,590,247 | 6/1971 | Hollard . |
| 3,622,278 | 11/1971 | Elzingn . |
| 3,731,100 | 5/1973 | Lattin . |
| 3,864,574 | 2/1975 | Wilhelm et al. . |
| 3,953,737 | 4/1976 | Neeb et al. . |
| 3,982,129 | 9/1976 | Lattin et al. . |
| 3,997,297 | 12/1976 | Jenkins et al. . |
| 4,009,005 | 2/1977 | Johnson . |
| 4,030,887 | 6/1977 | Poli et al. . |
| 4,185,199 | 1/1980 | Droullard et al. . |

FOREIGN PATENT DOCUMENTS 1246060 10/1960 France ............................ 376/256

52-64591 5/1977 Japan ................................. 376/256

OTHER PUBLICATIONS

A. A. Moghissi et al., Nuclear Power Waste Technology, ASME, New York, N.Y., pp. 218–219.
M. W. Carter, Management of Low-Level Radioactive Waste, Pergamon, pp. 439–451.

Primary Examiner—Harold J. Tudor
Assistant Examiner—Richard W. Wendtland
Attorney, Agent, or Firm—Scully, Scott, Murphy & Presser

[57] ABSTRACT

A nuclear reactor radioactive emission monitor measures quantities of a selected radioactive component in a stream of radioactive fluid. The device comprises two fluid paths with each path having a filter to absorb a radioactive component while passing the remainder of the stream of radioactive fluid; each fluid path also has a detector to measure the level of radioactivity emitted by the retained radioactive component in the two filters. A valve alternately directs the stream of fluid from the first fluid path to the second fluid path while simultaneously purging the remainder of the fluid from the non-selected fluid path. The output of one or more of the detectors is integrated as a function of time to indicate any increase in the radioactivity emitted by the radioactive component retained by the filter.

20 Claims, 6 Drawing Figures

REACTOR RADIOACTIVE EMISSION MONITOR

FIELD OF THE INVENTION

The present invention is particularly applicable to the operation of a nuclear reactor or a nuclear facility wherein it is desired to separately monitor the amount of a preselected radioactive component, particularly radioactive iodine that may be present in the effluent gases containing high levels of radioactive noble gases.

BACKGROUND OF THE INVENTION

The operation of a nuclear reactor results in the creation of various radioactive elements, particularly radioactive isotopes that are present in the cooling air or effluent gases surrounding the reactor. Therefor, the Nuclear Regulatory Commission provides stringent controls for the amount of radioactive components that may be discharged into the atmosphere, or into the water circulated through the cooling towers. The control is normally accomplished by filtering the effluent cooling air to remove any particulate materials. The filtered effluent is then monitored routinely to provide an alert if the permissive amount of radioactive substances present in the effluent gas is exceeded.

In particular, it is desired to closely monitor the amount of radioactive iodine or iodine particulates inasmuch as they pose a substantial health hazard. Molecular levels of radioactive noble gases are discharged into the atmosphere and dissipated at levels that do not pose a significant health hazard inasmuch as the noble gases do not react or combine with organic materials. Radioactive iodine, however, is taken up by organic materials and may be concentrated in the food chain, eventually being concentrated in the thyroid gland. Consequently, radioactive iodine and particulates are much more of a health hazard than radioactive noble gases.

The prior art discloses a number of devices intended to separately monitor the level of radioactive iodine present in a stream of gas containing radioactive noble gases. These detectors do provide an accurate indication of the relative proportion of radioactive iodine present in the gas stream containing radioactive noble gases when operating under normal operating conditions. Examples of these types of monitors are as follows.

U.S. Pat. No. 3,982,129 to Lattin et al. discloses a method and means of monitoring the effluent from nuclear facilities wherein radioactive iodine is detected in the effluent cooling gas from a nuclear reactor by passing the effluent gas through a continuously moving adsorpent filter material which is then purged of noble gases and conveyed to a detector for measuring the retained radioactive iodine adsorped by the filter material.

U.S. Pat. No. 3,731,100 discloses a monitor of the concentration of radioactive iodine in a stream of gas wherein the concentration is measured by counting the total radiation in the effluent, filtering out the particulate radioactive substances in the filter, and then measuring the radiation in the effluent after filtration. The second level of radiation is subtracted from the first level of radiation to obtain an indication of the amount of radioactive iodine retained by the filter.

U.S. Pat. No. 3,953,737 discloses a method and apparatus for monitoring radioactive particles carried by a floating fluid. In this device, the radioactivity of particles suspended in a flowing water stream is continuously monitored by passing the flowing water through a filter to form an increasing collection of the radioactive particulate materials. The collection is continuously monitored by a radioactivity detector which is upwardly adjustable as a function of time. In the event the amount of radioactivity exceeds the predetermined upward adjustment of the counter, an alarm is sounded.

U.S. Pat. No. 4,030,887 discloses a carbon monoxide detection apparatus and method, having a rotatable valve means for alternately directing a sampled stream of carbon monoxide to a first fluid path while simultaneously allowing a second fluid path to discharge to the atmosphere. When the valve means is rotated, the second fluid path receives a fluid flow, and the first fluid path is discharged into the atmosphere.

U.S. Pat. No. 3,997,297 discloses a method and apparatus for detecting a constituent in an atmosphere wherein the incoming air stream is split into two identical fluid paths having plural detectors. A purging gas, preferably argon, is used to remove the non-selected constituents from the region of the detectors. Detection is accomplished by selectively destroying the selected material by heat in one of the fluid paths.

The foregoing detectors, such as that disclosed in U.S. Pat. No. 3,731,100 are sufficiently capable of distinguishing between radioactive iodine and radioactive noble gases under normal design operating conditions. However, the accident at the Three Mile Island Plant in Pennsylvania identified a problem which exists with current on-line radioactive iodine monitors. The problem appears under abnormal or emergency conditions when there are substantially larger amounts of radioactive noble gases passing through the monitor. This problem is particularly accute when the level of radioactive noble gases is on the order of 2–10 orders of magnitude higher than the normal design operating parameters. The monitor may be faced with discriminating at levels one thousand to one million times its intended design parameters.

The additional problem, caused by abnormal conditions, is caused by noble gas atoms which decay as they pass through the detector chamber, emitting gamma radiation. The "Compton Scattering" effect creates an angle of scattered radiation that will impinge upon the window range of the detector. While at normal design parameters, the level is not sufficiently high to be troublesome, when the level of noble gases is increased by one thousand to one million times, the amount of scattering will appear to the monitor, to be radiation emitted within the window range of the detector, and will be detected as radioactive iodine. Therefore, the monitor indicates a much greater amount of radio-iodine in the gas stream than actually exists.

SUMMARY OF THE INVENTION

The present invention is intended to selectively monitor the amount of radioactive iodine present in a stream of radioactive noble gases. The monitor is intended to function equally well at normal levels of radiation, and under abnormally high or emergency conditions. The present invention is intended to avoid the problems inherent in the "Compton Scattering" effect wherein high levels of radioactive noble gases will emit radiation within the window range of a radioactive iodine detector.

The present invention includes both a method and a means for detecting radioactive iodine in the effluent air stream that is discharged from a nuclear reactor, or a containment vessel for a nuclear reactor wherein the air stream includes quantities of radioactive noble gases of substantially higher magnitude than the radioactive iodine. The invention includes a first and second fluid flow path for conveying the air stream to first and second adsorpting filters. Each of the filters are selected to retain the radioactive iodine, or other preselected radioactive component, while passing the residual radioactive noble gases. A valve means is provided for alternately directing the air stream between the first or second fluid flow path, while simultaneously directing an inert gas to the non-selected flow path. The inert gas is used to purge the non-selected filter of any radioactive noble gases during the non-selected cycle. First and second detectors are provided adjacent to the first and second filters to monitor the level of radiation emitted by the filters during both the selected and non-selected cycles. Integrating means and signal processing means are also provided for integrating the output of at least one of the detectors as a function of time to provide an incremental output signal indicative of the radioactivity emitted by the collected iodine retained by the adsorpting filters. The output signal from the integrating means provides a functional value indicative of the amount of iodine present in the effluent air stream emitted from the reactor.

While the present invention will be described in detail with respect to a monitor capable of detecting radioactive iodine in the effluent gases of a nuclear reactor, the present invention is equally applicable to detecting any radioactive component in any filterable radioactive fluid medium. For example, radioactive material in a flowing stream of steam or water may be monitored if the filter media is capable of selectively collecting the defined radioactive particle of interest. Any preselected radioactive component may be separately distinguished and monitored, provided a filter exists that will discriminate between it, and the remainder of the radioactive molecules also present in the flowing fluid stream.

While the primary application of the present invention is to flowing fluid gases, it is felt the present invention is equally applicable to flowing liquids.

DETAILED DESCRIPTION OF THE PREFERRED EMBODIMENTS

Figure 1:
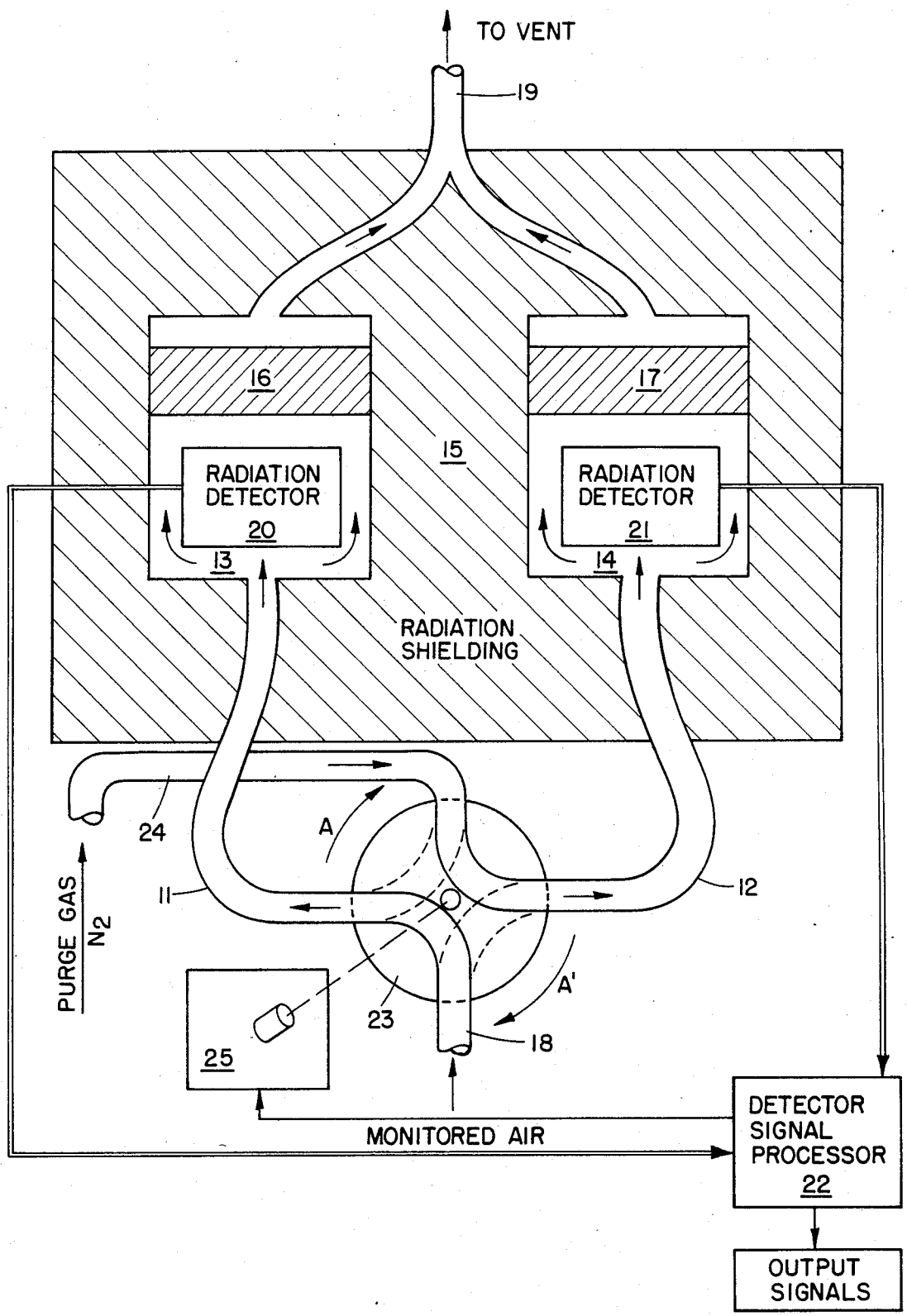
FIG. 1 is a diagrammatic and partially cross-sectioned view of a monitor constructed in accordance with the teachings of the present invention.

FIG. 1 is a diagrammatic and partially cross-sectioned view of a monitor for measuring the amount of radioactive iodine contained in the effluent stack gas of a nuclear reactor.

The accident at Three Mile Island Unit-2, and the subsequent purging of Krypton-85 from the primary containment identified a problem which exists with current types of on-line radioactive iodine and/or particulate monitors. This problem appears in situations when there is a large amount of radioactive noble gas passing through the monitor as compared to the amount of radioactive iodine and/or particulates collected by the monitor. The problem is caused by the "Compton Scattering" effect, that is the decay of noble gas atoms as they pass through the detector chamber, emitting radiation which, in part, looks to the monitor as if there is significantly more radiactive iodine and/or particulates present than are actually there.

During the Three Mile Island accident, the original estimates of the amount of radioactive iodine which were released into the environment were greatly exaggerated due to this problem. During the subsequent purging of Krypton-85 from the reactor containment, the purging was terminated a few minutes after its inception due to a false reading on the radio iodine stack monitor. The reinitiating of purging was delayed many hours before it was determined that the stack monitor had given a false reading.

Because of differences in chemical and/or physical properties, radioactive iodine and particulates are much more of a health hazard than radioactive noble gases. Radioactive iodine may be concentrated in the thyroid gland of animals, and work its way up the food chain to constitute a significant health hazard. Noble gases, on the other hand, are inert, and do not react or combine with other materials to be accumulated in living organisms. Thus, Government regulations allow considerably larger amounts of radioactive noble gases to be released into the nuclear workers environment and into the public environment than radioactive iodine and/or particulates.

As illustrated in FIG. 1, the monitor designed for solving the foregoing problem includes two identical flow paths 11 and 12 with two identical monitoring chambers 13 and 14 which are separated from one another, and their surroundings with sufficient radiation shielding 15 to prevent significant radiation from one chamber or from the environment from reaching the detectors.

Each chamber contains identical collection media 16 and 17 such as a particulate filter or iodine adsorption or adsorpting filter that is chosen to selectively remove the radioactive iodine and/or particulates of interest from the monitored air while not retaining significant amounts of radioactive noble gas.

Each of the means for retaining the selective radioactive component is mounted in the fluid path which begins with the monitored air at 18 and exits through an exhaust vent at 19.

Each of the first and second means for retaining the selected radioactive components 16 and 17 is monitored by identical first and second radiation detectors 20 and 21 that provide the same radiation counting geometry. While the first and second fluid flow paths 11 and 12, the first and second means for retaining the selected radioactive components 16 and 17, and the first and second radiation detectors 20 and 21 are illustrated as being identical in FIG. 1, it should be noted that they need not be identically related, so long as they are related in a predictable and predetermined linear relationship that may be compensated for in the signal processor 22. As will be indicated hereinafter, the output signals from radiation detectors 20 and 21 are combined and integrated, so any variances in the geometry of the fluid flow paths, the adsorpting characteristics of the filter 16 and 17, or the radiation counting geometry of detectors 20 and 21 would result in signal variations which would need to be compensated for before combining or integrating the signals from the two flow paths. Additionally, while two flow paths have been illustrated in FIG. 1, it should be noted that additional fluid flow paths could be provided to achieve the same result that is achieved by the present invention.

As illustrated in FIG. 1, a valve means 23 is provided for alternately directing the effluent air stream from the nuclear reactor from the monitored air input 18 to the selected first or second fluid flow paths 11 and 12. The valve means 23 also directs an inert gas or purging gas from conduit 24 to the non-selected fluid path during the alternate cycle to purge the non-selected filter of any radioactive noble gases during the non-selected cycle. The valve means 23 rotates in the directions indicated by arrows A-A' to provide cyclic periods of radioactive gas and purging gas to each of the radiation chambers 13 and 14.

Switching valve 23 rotates between the position illustrated in FIG. 1, by solid lines, to the position illustrated in FIG. 1 with dotted lines to alternately cycle the monitored air between the first and second monitor chambers 13 and 14.

Figure 2A:
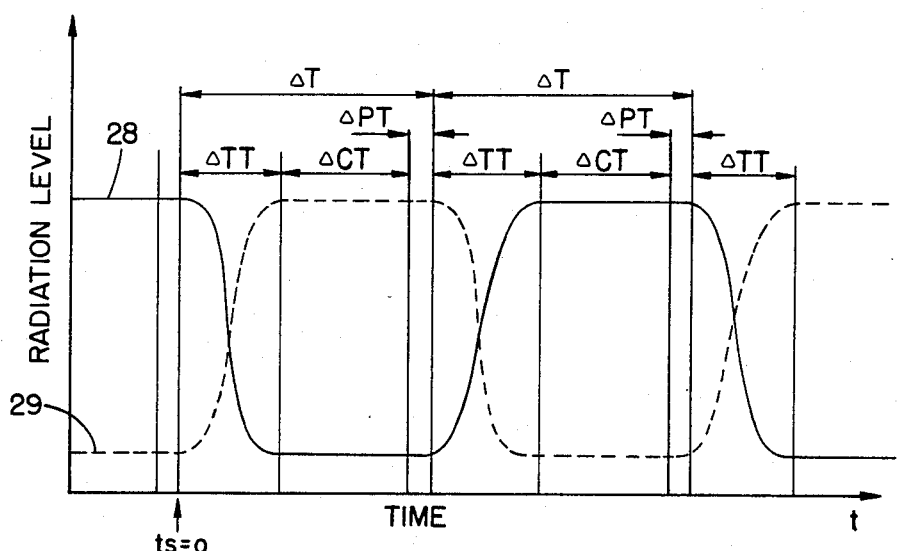
FIG. 2 is a graph illustrating the time relationship of the output signals of the first and second detectors.
FIG. 2b illustrates the combined output signals of two detectors indicating an adjustment of the counting period together with an increasing radioactive iodine or particulate level.
FIG. 2c is a graphic representation of the output signal curve from a single channel of the monitor in a multi-scale mode.
Figure 2B:
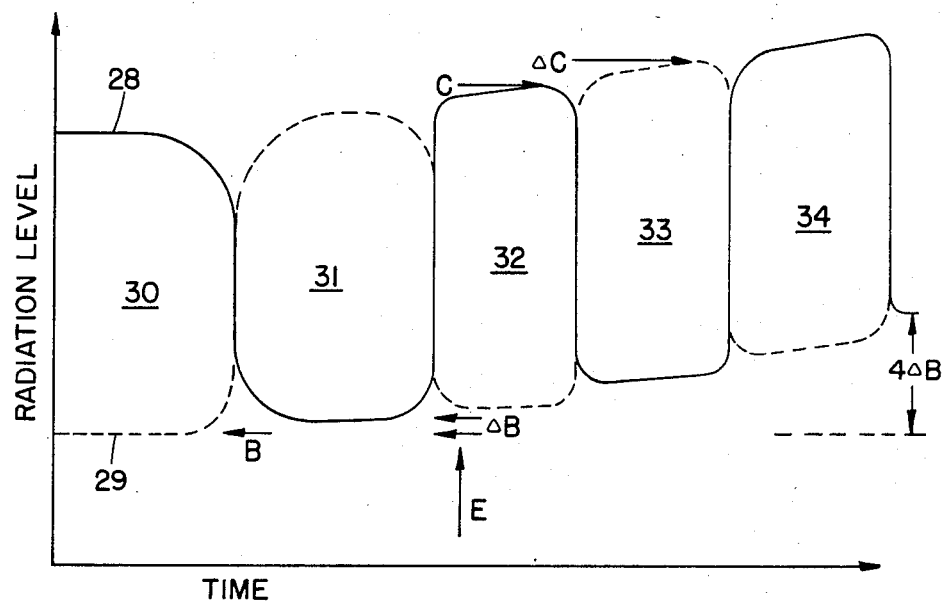

The device illustrated in FIG. 1 functions in the following manner. The air to be monitored flows continuously through the monitoring system beginning at conduit 18 and flowing alternately between the first and second fluid flow paths 11 and 12. Purging gas such as compressed air or nitrogen flows through the device in parallel with the monitored air beginning at conduit 24 so that as the monitored air is flowing through one chamber, the purging gas is flowing through the second chamber. Each radiation detector 20, 21 alternately detects radioactivity on the collection media plus radioactivity emitted by the noble gas passing through the chamber followed by the detection of only the radioactivity retained by the collection media. The combined typical output of the two detectors is illustrated in FIGS. 2a and 2b and indicates the types of signal traces expected during the passage of large amounts of noble gas with lesser amounts of radioactive iodine and/or particulates. The combined output of the two detectors then proceeds through the detector signal processor 22 where the background activity is subtracted from both trace signals followed by a combining of those portions of the two signals in which the purged gas is present, and those portions of the two signals in which the monitored air is present. The signal processor 22 removes any edge effects existing in the two signals produced when the chambers are only partially filled with monitored air or purged gas. The output of the signal processor 22 would be a signal which provides a functional value indicative of the amount of iodine present in the air stream and/or collected by the collection media 16, 17. The signal processor 22 may also provide a signal indicating the amount of noble gas passing through the monitor, the total amount of noble gas and radioactive iodine passing through the monitor and the rate of increase of either the radioactive iodine or the radioactive noble gas.

As illustrated in FIG. 2b, the invention contemplates the variable counting time wherein the cyclic variations of valve 23 are varied. By monitoring the integral counts of each successive segment and comparing the count with the integral counts recorded in the next one or two segments, the monitor can determine whether or not there is a significant increase of radioactive iodine of particulates on the filter collection media 16, 17. If such a trend or incremental increase is detected, the electronic signal processor 22 will produce an appropriate decrease in the counting period so that the system will have a shorter response time, and so that the composite signal curve, or xy plotted curve will continue to be a smooth curve rather than showing a series of increasing steps. When the rate of increase in radioactive iodine or particulates slows down, the counting time for segment can once again increase. The signal processor 22 varies the counting period of the monitor by altering the speed of valve motor 25 which rotates the valve means 23.

The timing of the rotation valve means 23, and its effect on the monitor is discussed with respect to FIG. 2a. The output of the detector 20 is indicated as a solid line in FIG. 2a while the output of radiation detector 21 is indicated as a dotted line in FIG. 2a. Time is the x coordinant of the signal illustrated in FIG. 2a, while the radiation level is the y coordinate of the signal illustrated in FIG. 2a. FIGS. 2a and 2b are diagrammatic and have been diagrammatically illustrated for the purposes of illustration. In actual practice, the shape of signal cycles closely approximate those illustrated in FIG. 2c.

The switching time intervals determined by valve means 23 are indicated in FIG. 2a. $\Delta t$ indicates the total time for a switching time interval, or a half cycle of the monitor. Two $\Delta t$ cycles result in one complete cycle of the monitor from fluid path 11 to fluid path 12. Each of the half cycle intervals $\Delta t$ can be divided into three parts: Count time, which is $\Delta ct$, transition time, which is $\Delta tt$, and data processing time, which is $\Delta pt$. The integration of the signals will be discussed hereinafter with respect to FIG. 3. As a practical matter, however, the signals designated by $\Delta ct$ are utilized by the signal processor 22 in deriving the functional value that is indicative of the total amount of radioactive iodine in the air stream, the total amount of radioactive iodine retained by the filter, the total amount of noble gas, the amount of noble gas flowing through the monitor, and the total of the radioacitve iodine and the radioactive noble gas. The transition time $\Delta td$ is the time interval when both chambers are in a transition state between the monitored air and the purging air. As shown in the experimental device illustrated in FIG. 4, the typical $\Delta tt$ time period was one to two seconds at a one cubic foot per minute purging gas flow rate. During $\Delta tt$, the signal processing unit 22 will signal the scalers (discussed with respect to FIG. 3) to stop counting. During $\Delta pt$, the signal processing unit 22 may perform the aforesaid calculations, other data processing tasks, the control of valve means 25, or other decision making without interferring with the counting and gas flow rates. In the experimental device illustrated in FIG. 4, $\Delta pt$ was 0.9 seconds. FIG. 2b illustrates two separate features of the invention. The first feature is a variable counting time feature which compares the integral counts of each successive segment with the integral counts of the following one or two segments. If the monitor or the signal processor 22 determine there is a significant increase in radioactive iodine or particulates on the collection media, the counting rate is increased. As indicated in FIG. 2b, cycle 30 is a continuance of the cycles illustrated in FIG. 2a within an essentially flat signal level at $\Delta$ct indicating a constant level of noble gas and no particulate iodine. As indicated in FIG. 2b, the solid curve 28 is a signal emitted by radiation detector 20, while the dotted signal 29 is a signal emitted by radiation detector 21. The background activity is subtracted as indicated by the arrow b in FIG. 2b.

During cycle 31, radiation detector 21 is in its purge mode, and an inert gas such as compressed air or nitrogen has evacuated the noble gas from chamber 13. The output of detector 20, however, has risen as indicated by $\Delta$B in FIG. 2. The incremental increase is indicative of radioactive iodine retained by filter 16 during the previous monitored cycle, beginning at event arrow E.

Figure 2C:
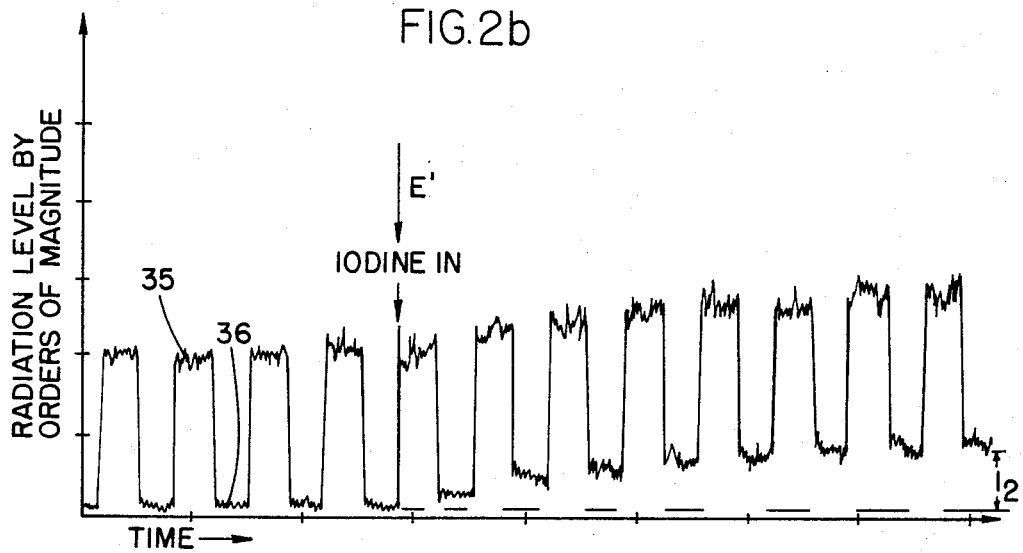

Upon sensing $\Delta$B, the signal processor 22 provides an appropriate decrease in the counting period so that the system will have a shorter response time and the composite curve will continue to be a smooth curve rather than showing a series of increasing steps as illustrated in FIG. 2c.

The arrow C, and the incremental increase $\Delta$C are indicative of either an incremental increase in the amount of iodine retained by the filter, or an increase in the level of iodine and noble gas. To determine if the level of noble gas has increased, $\Delta$B is subtracted from $\Delta$C, and the net amount is indicative of the increase in the radioactivity emitted by the noble gas passing throught the monitor.

Figure 4:
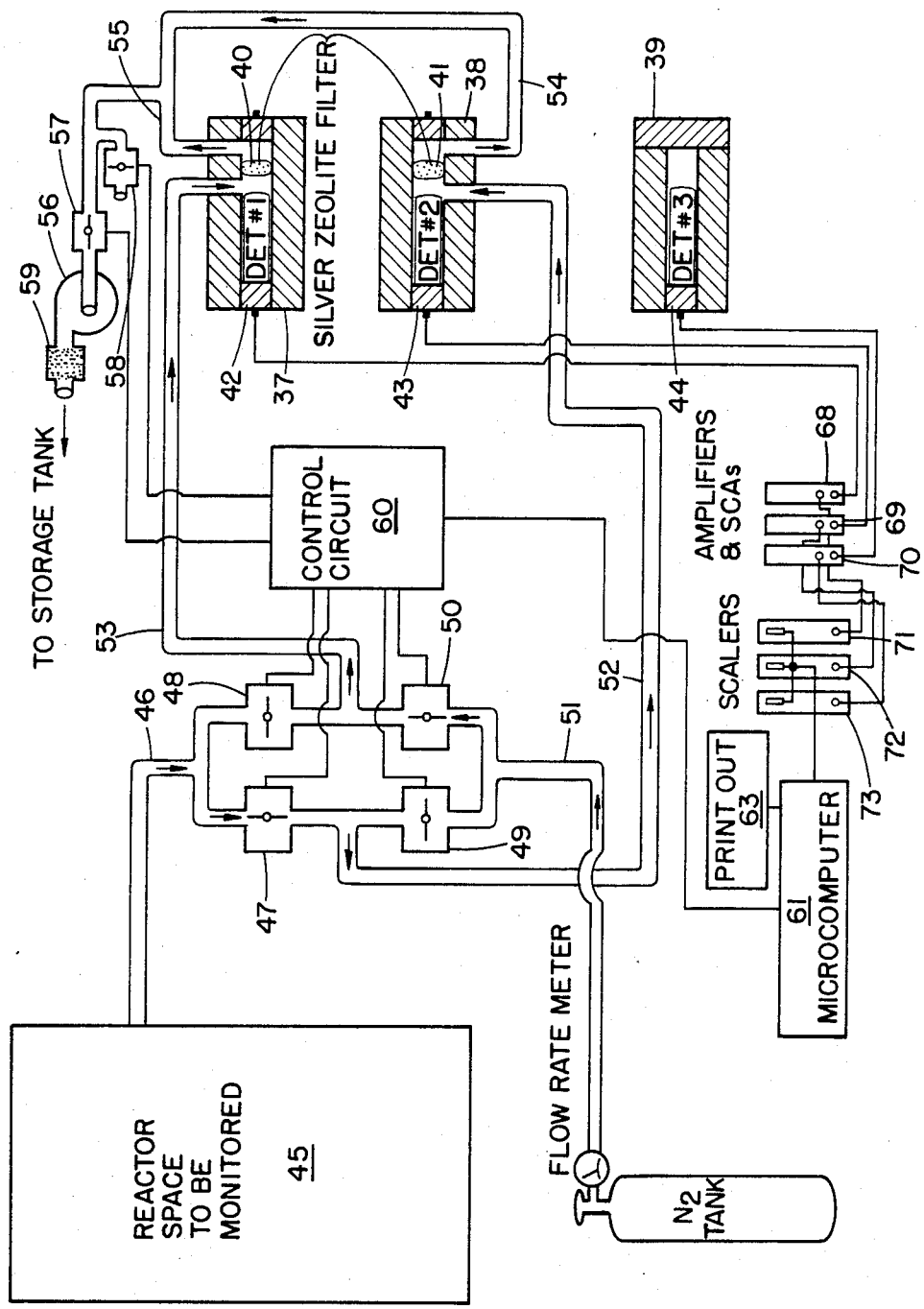
FIG. 4 is a diagrammatic and partially cross-sectioned view of an alternate embodiment of the present invention used in testing the present invention.

FIG. 2c is a representation of a strip chart made from a test of an apparatus illustrated in FIG. 4 wherein the output of a single detector was monitored on the strip chart recorder. During this test, radioactive argon was combined with radioactive iodine. As indicated in FIG. 2, the square wave pulses 35 are indicative of the output of the first detector wherein the device was sampling a continuous stream of argon gas. The valley or bottom of square wave pulse 36 is indicative of the level monitored by the detector during the purge mode of the device. At event E', iodine was introduced into the argon stream, and the resultant incremental step increase in the remaining time periods was found to be indicative of the total amount of radioactive iodine $I_2$ collected by the filter.

Figure 3:
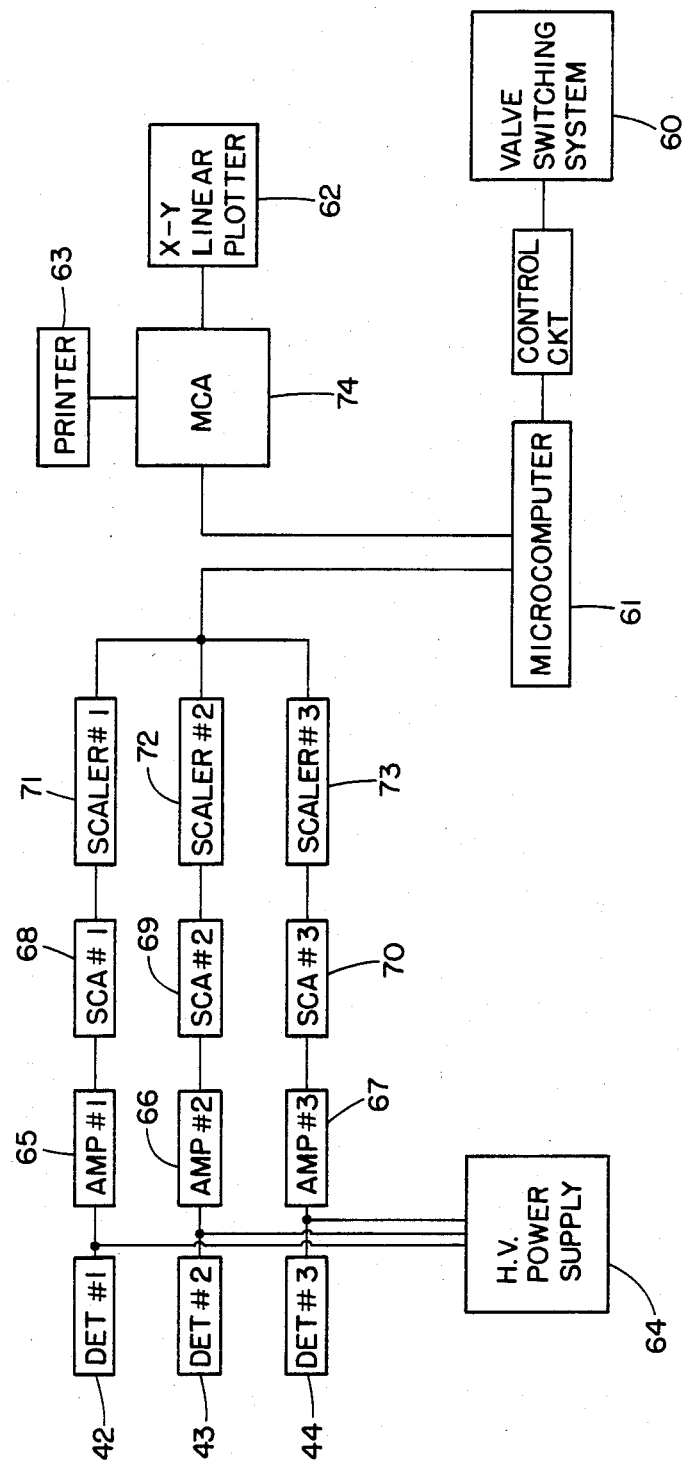
FIG. 3 is a diagrammatic signal flow chart of the iodine monitoring system.

The test results illustrated in FIG. 2c were produced by the embodiment illustrated in FIGS. 3 and 4. An iodine salt $NH_4I$ was irradiated in the Penn-state Breezedale Nuclear Reactor Rabbit-1 System. A calibrated Ge(Li) detector was employed to determine the exact iodine-128 activity of each sample. Iodine-128 having a half-life of 25 minutes was employed instead of iodine-131 for the test. Like iodine-131, iodine-128 is both a strong bata and gamma emitter, but it has the advantage of quickly decaying so that subsequent tests can be made daily without the problem of decontaminating the system before each test. The differences between iodine-128 and iodine-131 are set forth below in Table 1.

TABLE 1

| COMPARISON OF NUCLEAR PROPERTIES OF IODINE-128 AND IODINE-131 | | |
|---|---|---|
| | Iodine-128 | Iodine-131 |
| Production | Neutron Activation $127_{I(n,\gamma)}128_I$ | Fission Product |
| Half-life | 24.99 min | 8.05 days |
| Decay Mode | $\beta-$ | $\beta-$ |
| Max. $\beta-$ energy | 2.12 MeV | 0.606 MeV |

TABLE 1-continued

| COMPARISON OF NUCLEAR PROPERTIES OF IODINE-128 AND IODINE-131 | | |
|---|---|---|
| | Iodine-128 | Iodine-131 |
| Major $\gamma$ peak energy | 0.443 MeV | 0.364 MeV |

The irradiated salt $NH_4I$ was then chemically reacted to produce $I_2$ gas, which in turn was bled into an air stream entering the iodine monitor unit.

To simulate the high background radioactivity of noble gases, a stream of air containing argon-41 was produced by pumping air through a vertical tube located adjacent to reactor core. By varying the pumping rate and/or the reactor power level, the concentration of argon-41 and the air stream could be varied by several orders of magnitude. Thus, it was possible to establish constant or variable amounts of argon-41 passing through the monitor along with the known amount of iodine-128. The ability of the system to detect radioiodine in the presence of a high radioactive noble gas field was thereby varified.

While argon-41 was used in the experiment, the most critical of the noble gas effluents are the krypton and xenon radioisotupes. The following table, Table 2, denotes the principle noble gas effluents of concern.

TABLE 2

| NOBLE GAS EFFLUENTS FROM A NUCLEAR POWER PLANT AND THEIR MAJOR GAMMA ENERGIES[2] | | |
|---|---|---|
| Isotope | Half-life | Major Gamma Energy (KeV) |
| Argon-41 | 1.83 h | 1293 |
| Krypton-85 | 10.76 y | 514 |
| Krypton-85m | 4.4 h | 157.2, 305 |
| Krypton-87 | 76 min | 403, 850, 2050, 2570 |
| Krypton-88 | 2.8 h | 166, 191, 360, 850, 1550, 2190, 2400 |
| Xenon-133 | 5.27 d | 81 |
| Xenon-133m | 2.3 d | 233 |
| Xenon-135 | 9.2 h | 250, 610 |
| Xenon-135m | 16 m | 527 |
| Xenon-138 | 17 m | 160, 260, 420, 518, 1780, 2020 |

As illustrated in FIG. 4, three identical sets of monitoring chambers and detectors were tested, 37, 38, and 39. The chambers 37-39 were separated from one another and their surroundings by a lead cylinder with 3-inch thick walls to prevent significant radiation from the other chambers or from the surrounding environment from reaching the detectors.

Two of the chambers contained identical silver zeolite iodine adsorption canisters. The third chamber 39 was used for background radioactivity measurements. Silver zeolite has a property of retaining only the iodine from the monitored air while not retaining significant amounts of radioactive noble gases. Each of the filters was monitored by identical radiation monitors, to provide the same radiation counting geometry for each detection cell.

In the preferred embodiment of the invention, the first and second means for retaining a selected radioactive component 16,17 (FIG. 1) and 40-41 are silver zeolite filters. Because of their stability in the presence of ionizing radiation and in solutions at high temperatures, zeolites or molecular-sieve ion exchangers offer significant advantages in the separation and purification of radio-isotopes. Their low soluability over wide pH ranges, together with the rigid frame work and dimensional stability and attrition resistance, have endowed zeolites with properties which generally surpass those of the other inorganic ion exchangers.

Each of the detectors 42-44 utilized a NaI(Tl) detector with detectors 42 and 43 matched to filters 40 and 41, and detector 44 measuring background radiation.

In the experiment, the reactor space to be monitored 45, was replaced as indicated previously with a system for producing argon-41 and trace amounts of radioactive $I_2$. This stream was fed into the system through conduit 46 into a set of matched flow regulator valves 47-50 that cycled the effluent from conduit 46 between the two monitor cells 37 and 38. As indicated in FIG. 4, the effluent gas was directed by means of valves 47 and 49 to the monitor cell 38 while cell 37 is being purged of the argon-41, iodine-128 mixture by means of an inert gas such as $N_2$ supplied by a conduit 51 and directed by valves 50 and 48 to the monitor cell 37. It should be noted that in order to clarify the layout schematically illustrated in FIG. 4, supply lines 52 and 53 are unequal in length. In actual practice, it is desired to make the first and second flow paths as identical as possible to minimize the post processing necessary to achieve identical comparative results from the detectors 42 and 43. Similarly, the exhaust conduits 54 and 55 should provide the same relative negative atmospheric pressure to each of the cells from the suction pump 56. The negative pressure applied by blower 56 is varied by means of valves 57 and 58 wherein valve 57 varied the flow rate, while valve 58 varied the static pressure. It is desired to maintain a negative atmospheric pressure in the system to prevent the contamination of the monitor and surrounding environment that would result from leakage of the system when operated under a positive pressure. The output of blower 56 was filtered at 57 and supplied to a storage tank for effluent decay. The operation of valves 47-50 and 57, 58 are controlled by valve control circuit means 60, which in turn is regulated by the micro-processor 61.

The flow rates used in the test device illustrated in FIG. 4 varied upon the diameter, length, roughness, and layout of the flow lines. The inlet monitored air stream was found to vary between the range of 2.0 to 2.5 cfm when the purging gas ($N_2$) was varied from 0 to 0.5 cfm. The output flow, combining flows from both chambers, was measured and found to be about 4.0 cfm, thereby indicating that about 1 cfm of room air was leaking into the monitor system.

The system illustrated in FIGS. 3 and 4 utilize a micro-computer 61 that provided both a graphics display through an x-y linear plotter 62 and a numerical display through printer 63. Each of the detectors 42-44 were powered by a high voltage power supply 64 and their output supplied to amplifiers 65-67 and single channel analyzers 68-70. The amplifiers are used to amplify and shape the signals from the detector. The function of the single channel analyzer (SCA) is to get the counts in only the specific energy range of interest. Additionally, the single channel analyzer converts the pulse signal into a square wave signal. In the system, the single channel analyzer window was set to center on 0.443 MeV (the major gamma peak of iodine-128). The width of this channel was set at ±0.15 MeV about this energy level. The output of each of the single channel analyzers was provided to scalers 71-73 wherein each of the scalers was a self-controlled 40 MHZ counter. The counter included an 8 decade scaler, and integrated the count rate from the single channel anaylzer during each of the Δct time periods previously illustrated in FIG. 2a. In the embodiment illustrated in FIGS. 3 and 4, a multi-channel analyzer 74 was used to simultaneously plot the spectrum collected on the x-y linear plotter 62, while simultaneously printing out the counts of each channel from the analyzer memory on printer 63.

As indicated previously, FIG. 2c was obtained from a test of the system illustrated in FIGS. 3 and 4. After the system was in operation for a few cycles without iodine, the iodine was introduced at interval E' illustrated in FIG. 2c. The dwell time for each channel was set by the micro-processor 61 at 0.9 seconds. The square wave-like curve shows the repetition of the argon mode and purge mode for channel 1 or detector 42 illustrated in FIGS. 3 and 4. Because the dwell time for each channel was only 0.9 seconds, the statistical fluctuations the detector output occur on both the upper argon and lower iodine plateau. This effect could be eliminated by setting longer dwell times for the channel. It should be noted that it takes only about 2 seconds for the system to be completely purged and about the same amount of time for it to return completely to the argon mode.

The print-out spectral data from the multi-channel analyzer showed the count in the iodine-128 peak region was 9,796 counts in the purge mode, and 89,098 counts in the argon mode. Correcting this data by subtracting a background count of 2,364 (from detector 44) and for iodine-128 decay, it was found that the count recorded in the iodine peak region was 11 times lower in the purge mode than in the argon mode.

In addition to overstating the amount of radioactive iodine, the detector that utilizes a count rate at the higher level of radioactivity suffers a loss of accuracy by virtue of the overwhelming count rate arising from the "Compton Scattering" of the noble gases. If the measurement is made at the peak of the argon mode, the total change in detector output would be 7,432 or slightly over an 8 percent deviation. When measured in the purge mode, the count was virtually 100 percent. If the detector system were capable of detecting an 8 percent deviation, and the iodine content on the filter were reduced by a factor of 10, the detector measuring in the peak mode would not be able to detect the presence of the radioactive iodine, but it could be detected and accurately quanified in the purge mode. Conversely, if the magnitude of the noble gas count were increased by a factor of 10, the change in detector signal would be 0.8 percent, while in the purge mode the accuracy would still approach 100 percent.

While a preferred embodiment has been illustrated in FIG. 1, and a test embodiment illustrated in FIGS. 3 and 4, it should be understood that the applicaton of the invention is not restricted to the specific system of valves and piping, nor to the specific electronic configuration used for measuring and integrating the count rate from the system. The invention, is described in the appended claims, includes the use of a first and second means for retaining a selected radioactive component wherein the means may be alternately subjected to the effluent stream, and subsequently purged of the high level of radioactive materials in order to measure the residual remaining selected radioacitve component present on the retaining means. By alternately directing the stream of effluent fluid from the first or second retaining means, and by integrating the output of one or more of the detectors as a function of time to measure the incremental increase in the radioactivity emitted by the retaining means, one is able to accurately derive a functional value indicative of the amount of selected radioactive component in the retaining means. By integrating the effluent stream radioactive count, one is able to derive a functional value of the total amount of radioactivity in the fluid. By subtracting the first integrated count and the second integrated count, one may also obtain a functional value representative of the non-selected radioactive noble gases passing through the system.

What is claimed is:

1. A means for measuring quantities of a selected radioactive component in a stream of radioactive fluid, said means comprising:
   (a) a first fluid path with a first means for retaining said selected radioactive component mounted in said fluid path for retaining said radioactive component while passing the remainder of the stream of radioactive fluid;
   (b) a second fluid path with a second means for retaining said selected radioactive component mounted in said second fluid path for retaining said radioactive component while passing the remainder of the stream of said radioactive fluid;
   (c) first and second detectors for detecting the level of radioactivity emitted by the retained radioactive component in said first and second retaining means;
   (d) a means for alternately directing the stream of fluid from said first fluid path to said second fluid path while simultaneously purging the remainder of the radioactive fluid from the non-selected fluid path;
   (e) a means for integrating the output of one or more of the detectors as a function of time to measure any increase in the radioactivity emitted by the radioactive component retained by said retaining means,
   said increase being representative of the amount of selected radioactive component present in the stream of radioactive fluid.

2. A means for measuring quantities of a selected radioactive component as claimed in claim 1 which further includes means for providing an inert fluid to purge the alternate fluid path during said non-selected periods.

3. A means for measuring quantities of a pre-selected radioactive component as claimed in claim 1 which further includes a processor means to measure the increase in radioactivity detected during the purge cycle of each associated detector and retaining means, the absolute value of said measured increase defining a functional value of the absolute amount of said selected radioactive component in said fluid stream.

4. A means for measuring quantities of a pre-selected radioactive component as claimed in claim 3 wherein said detector and processor means also measures the absolute values of the radioactivity detected during the fluid stream cycle to provide a functional value of the total amount of radioactivity in said fluid and the amount of selected radioactive component in said fluid.

5. A means for measuring quantities of a selected radioactive component as claimed in claim 1 or 2 or 3 or 4 wherein said means for retaining said selected radioactive component comprises an adsorpting filter.

6. A means for measuring quantities of a selected radioactive component as claimed in claim 5 in which said adsorpting filter is a silver zeolite molecular sieve for retaining iodine as the selected radioactive component.

7. A means for measuring quantities of a selected radioactive component as claimed in claim 1 or 2 or 3 or 4 in which a single channel amplifier is interposed between said detectors and said integrating means.

8. A means for measuring quantities of a selected radioactive component as claimed in claim 7 wherein said single channel amplifier centers on a major $\gamma$ peak energy of the selected radioactive component.

9. A means for measuring quantities of a pre-selected radioactive component as claimed in claim 8 wherein said peak $\gamma$ energy is 0.364 MeV for iodine 131, said single channel analyzer having a channel width of $\pm 0.15$ MeV.

10. A method of measuring quantities of a selected radioactive component on a continuous basis wherein said component is present in a stream of radioactive fluid, said method comprising:
    (a) continuously sampling said fluid and alternately directing said fluid through a first means for retaining said selected radioactive component and a second means for retaining said selected radioactive component at predetermined time intervals;
    (b) alternately purging the first and second means for retaining said selected radioactive components with an inert fluid between their respective selected cycles;
    (c) measuring the radioactivity emitted by said first and said second means for retaining said radioactive components, and integrating any increase in radioactivity as a function of time;
    (d) comparing the integrated measurements obtained from each retaining means during the selected cycle and purge cycle to provide a functional value which represents the amount of selected radioactive component in said radioactive fluid.

11. A method as claimed in claim 10 wherein the fluid is H$_2$O.

12. A method as claimed in claim 10 in which the fluid is the air stream vented from a nuclear reactor which contains radioactive noble gases and radioactive iodine.

13. A method as claimed in claim 10 which further includes the step of integrating both the total amount of radioactivity measured during the selected cycle and the amount of radioactivity measured during the purge cycle to determine functional values representative of both the total radioactive components in said fluid stream and the total amount of selected radioactive components in said fluid stream.

14. A method as claimed in claim 10 or 12 or 13 which further comprises the step of retaining said selected radioactive components with an adsorpting filter.

15. A method as claimed in claim 14 which further includes the step of retaining iodine as a selected radioactive component with a silver zeolite molecular sieve.

16. A method as claimed in claim 10 or 12 or 13 wherein a signal obtained from said measurement of said selected radioactive component is limited by a single channel amplifier to a preselected $\gamma$ peak energy level.

17. A method as claimed in claim 16 wherein said preselected $\gamma$ peak energy is 0.364 MeV for iodine 131, said single channel amplifier having a channel width of $\pm 0.15$ MeV.

18. A method as claimed in claim 10 wherein said preselected time interval is decreased to provide a higher cycle rate when any incremental increase in the level of the preselected radioactive component is measured.

19. A method as claimed in claim 10 wherein said method is carried out at a sub-atmospheric pressure.

20. A means for detecting radioactive iodine in the effluent air stream from a nuclear reactor wherein said air stream includes quantities of radioactive noble gases said means comprising:
 (a) a first fluid flow path for conveying said air stream to a first adsorpting filter, said filter retaining said radioactive iodine while passing said radioactive noble gases;
 (b) a second fluid flow path for conveying said air stream to a second adsorpting filter, said filter retaining said radioactive iodine while passing radioactive noble gases;
 (c) a valve means for alternately directing said air stream between selected first or second fluid flow paths, said valve means directing an inert gas to said non-selected fluid path during said alternate cycle to purge said non-selected filter of said radioactive noble gases during said non-selected cycle;
 (d) a first and second detector means adjacent said first and second filters, said detectors measuring the radioactivity of the noble gas and any retained iodine when said selected filter is receiving said air stream and measuring the retained iodine when said non-selected filter is receiving said inert gas;
 (e) an integrating means for integrating the output of at least one of the detectors as a function of time to provide an output signal indicative of the radioactivity emitted by the iodine retained by one or more of said adsorpting filters;
 (f) a signal processing means for receiving the output of said integrating means to provide a functional value indicative of the amount of iodine present in said air stream.

* * * * *